Patented Sept. 12, 1944

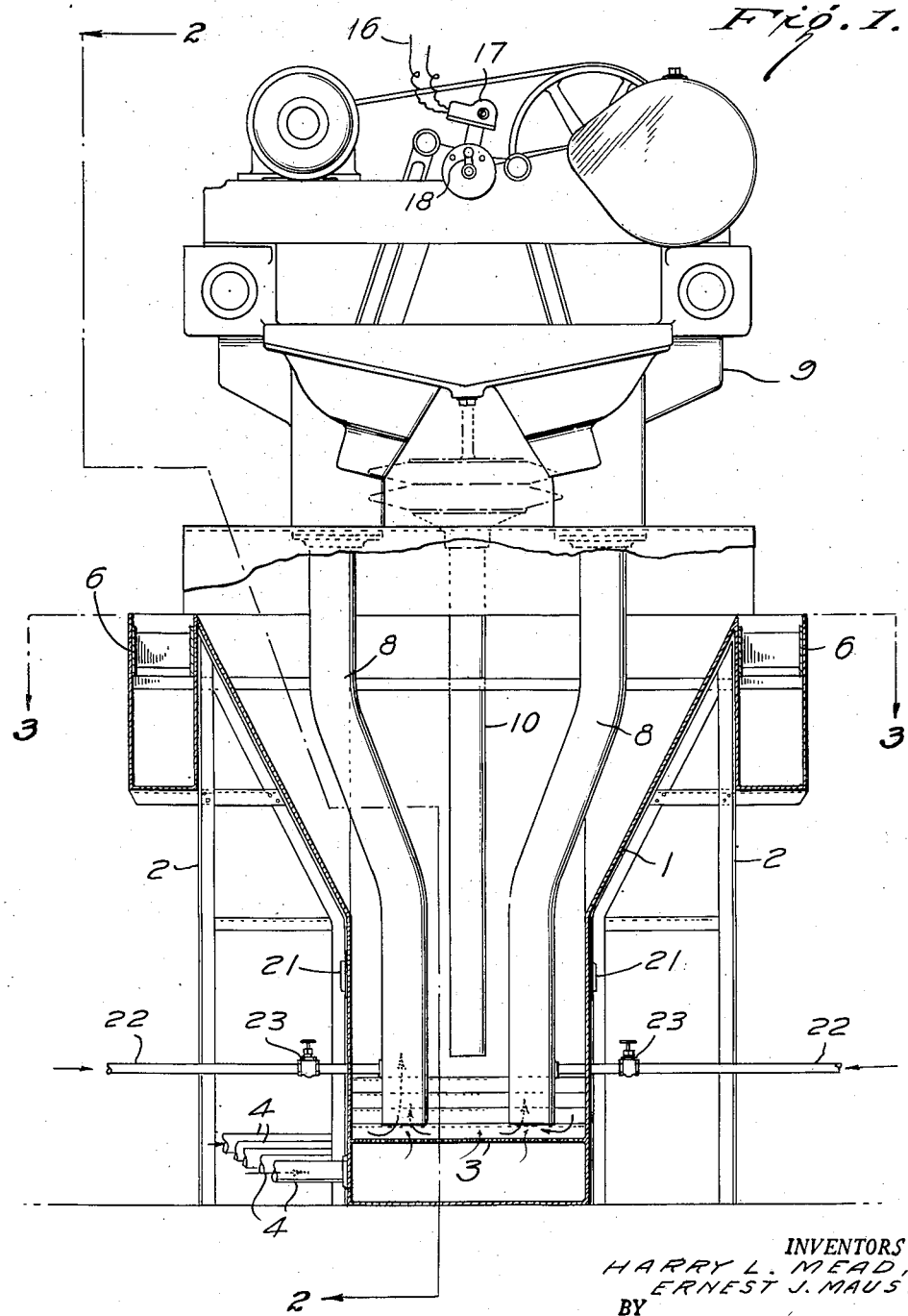

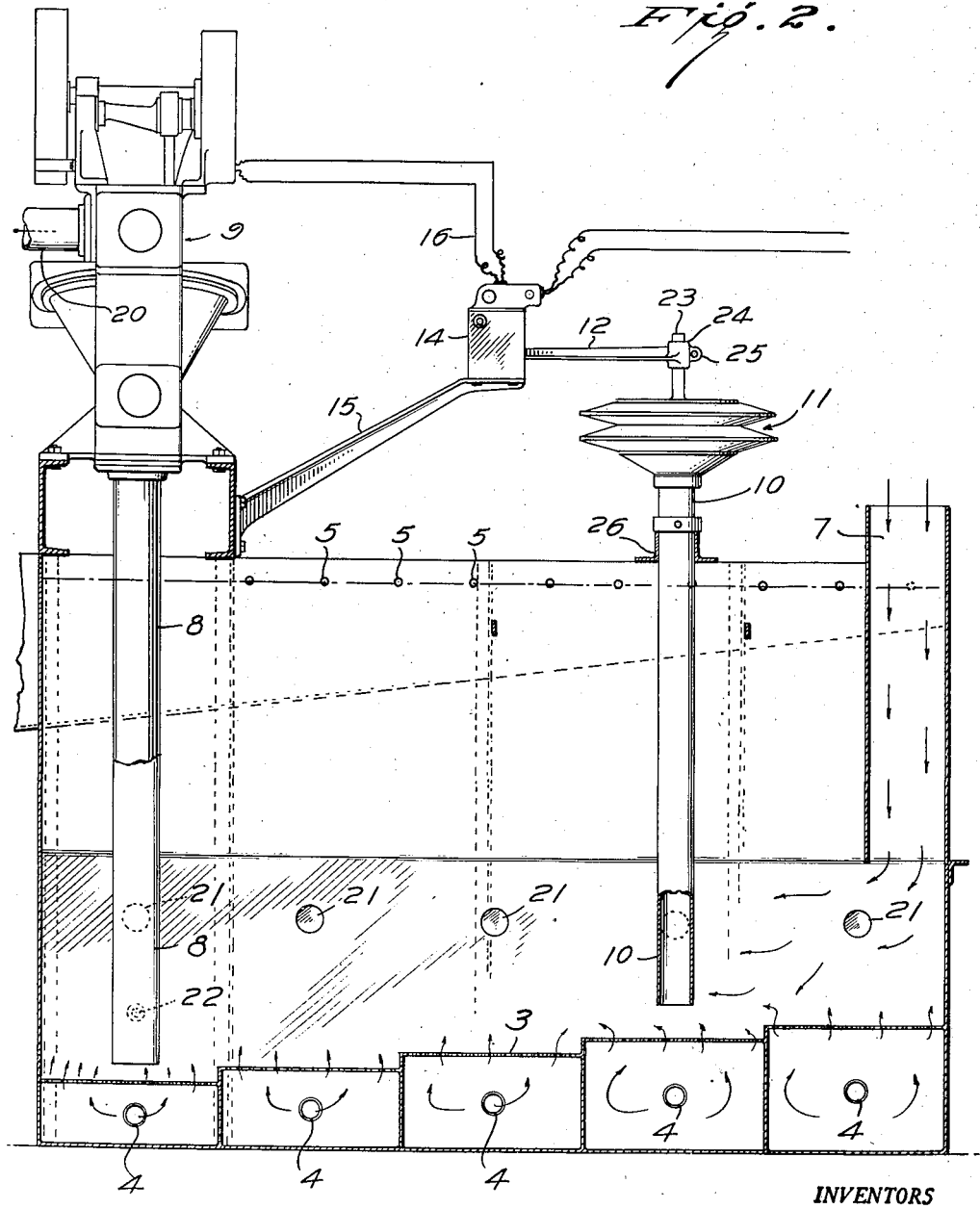

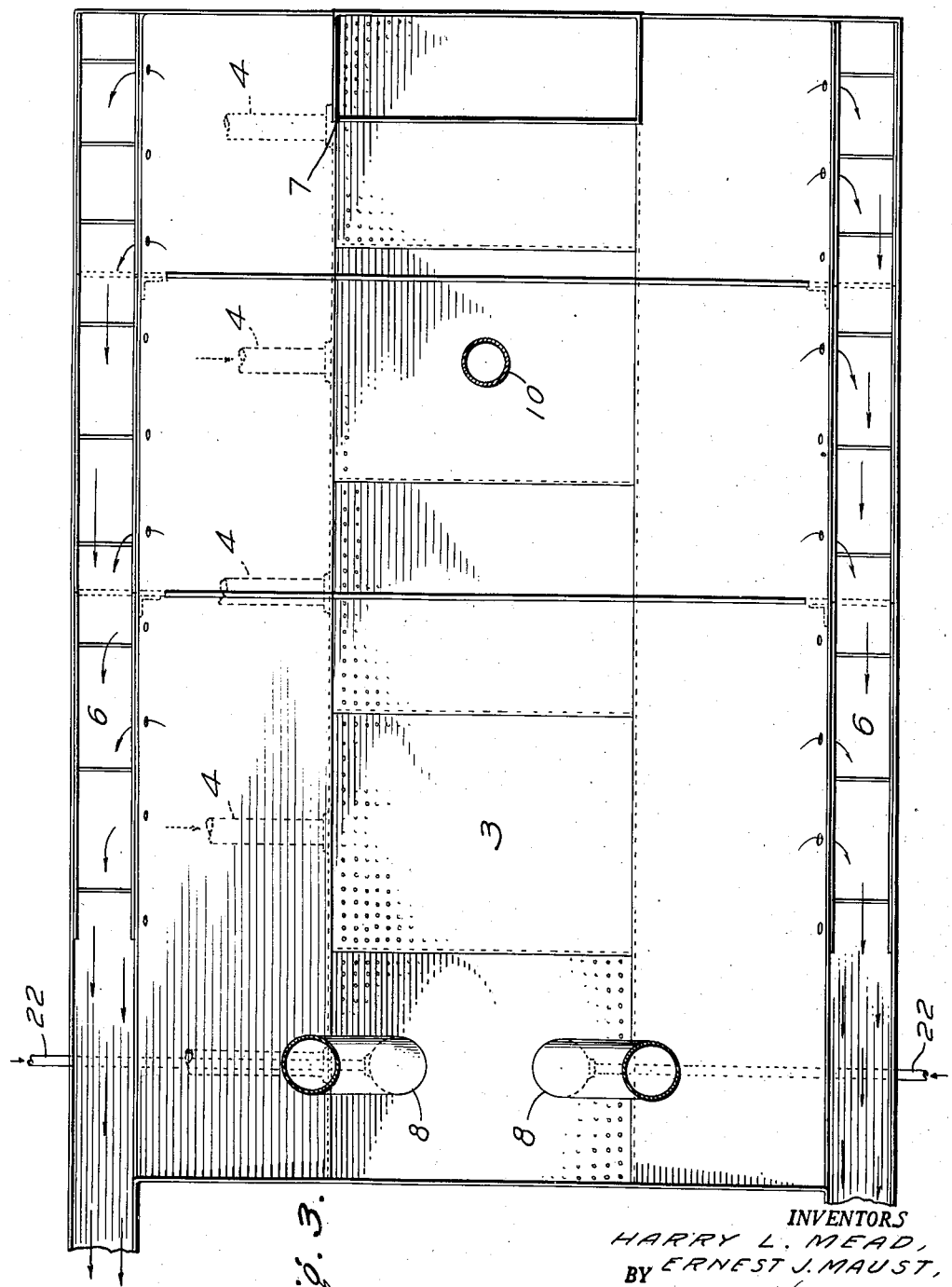

2,358,181

UNITED STATES PATENT OFFICE 2,358,181

HINDERED SETTLING CLASSIFIER

Harry L. Mead and Ernest J. Maust, Brewster, Fla., assignors to American Cyanamid Company, New York, N. Y., a corporation of Maine Application May 2, 1942, Serial No. 441,428

3 Claims. (Cl. 209—454)

This case relates to an improvement in the hindered settling classification of particles, more particularly to an apparatus for hindered settling classification in which a definite underflow fraction can be removed in an extremely dense, dewatered condition.

In many ore dressing operations it is highly desirable to be able to separate a definite size band from a mass of particulate material of different sizes. This can be readily carried out by means of screens or by hydraulic classification. Where the materials can be wet without being harmed, hydraulic classification has many practical advantages over the use of screens since it is simpler, faster and considerably more economical. As a result many forms of classifiers, both of the free settling and hindered settling types have been developed, examples of which are the well known Fahrenwald sizer and Dorr thickeners.

Classifiers of the hindered settling type, with which the present invention is concerned, have the advantage that they can make a much sharper classification than is possible with a free settling apparatus. Most hindered settling hydraulic classifiers depend upon a counter-current flow of fluid and material to be classified. Usually the fluid is moved upwardly against the normal downward fall of the particles and the volume of hydraulic water so used is carefully adjusted to permit the desired sizes to fall and those of less density to be carried up and away by the water flow. The upflow of the hydraulic water causes turbulence of the falling particles and produces a "teeter column" comprising a layer of mixed particles and water having an average bulk density greater than that of water. This density of this layer interferes with the free settling of the particles and gives rise to the "hindered" settling designation.

Both the depth and density of this layer are carefully controlled. One method of doing this is by a column of water in a standpipe extending from near the bottom of the classification chamber to a height above the water level in the chamber. The water in the standpipe will have a "super elevation" above the water level in the classification chamber due to the "heavy" layer at the bottom of the chamber. This super elevation varies as the density of the layer changes and operates a device to control the flow of hydraulic water and compensate for any density changes. The depth of this layer may be controlled by the height of the standpipe above the bottom of the classifier. Various arrangements are used so that the downward falling particles gradually accumulate in a definite area from which they are removed as the underflow.

While the known types of these sizers are entirely adequate for certain purposes, definite limitations on their use are imposed by the nature of the apparatus itself. For example, the heavy underflow material is ordinarily removed by allowing the settled sands to flow by gravity out through a spigot. This automatically limits the density to which the sands can be concentrated since for any particle size range and discharge opening there is a definite minimum water content below which spigot discharge is either impossible or impractical.

While this limit cannot be specifically stated for all cases, the water content is ordinarily above about 50 per cent since below that point it is substantially impossible to flow the sand-water mixture through any practical spigot. Enlarging the size of the discharge opening, while permitting the outflow of a considerably thicker sand and water mixture, is not practical to do so since the maximum discharge opening size is also fixed by the nature of the apparatus. If the discharge opening exceeds a certain maximum size, the outflow when the discharge port is opened will upset the steady upward water flow required to make a sufficiently sharp classification.

With these known types of apparatus therefore, the sharp classification is made at the expense of the water content of the sand and water mixture which comprises the underflow. Yet in many ore dressing procedures, this minimum water content is higher than is desirable for the next operation to be performed on the sands and the sands must be further dewatered before they can be processed. This necessitates the use of additional equipment and involves added charges for labor and power all of which increase the cost of the process. These additional charges may often make the difference between an economical operation and one which is not.

One instance where the sand and water mixture should be dewatered is found in connection with the froth flotation of ores such as those of copper, manganese and many others where the flotation feed must be ground to pass a certain size mesh. In such cases the grinding is usually done in a wet mill such as a rod or ball mill. These mills are often in a closed circuit with some sizing device, in the case of a hydraulic classifier the underflow being returned to the mill and the overflow comprising the flotation feed. However, a wet mill, in order to function efficiently, can not handle a particle and water mixture of less than a certain solid content. This optimum is usually higher than the maximum underflow density produced in any hydraulic classifier known prior to the present invention.

Another instance occurs in connection with the beneficiation of phosphate ores by full range flotation. In the beneficiation of phosphate ores such as Florida pebble phosphate two serious problems are encountered. First, the flotation feed must be deslimed. This desliming must be very thorough since the flotation, particularly if cationic reagents are used, is sensitive to slimes and the presence of as little as 0.2% begins to interfere with the efficiency of the reagent. Secondly, for the proper use of the reagents it is necessary that the flotation feed be conditioned with the reagents at a high solid content before diluting the feed for the actual flotation, a solid content of about 60% or greater being desirable.

Either of these problems may be solved in itself by means of known equipment. However, the desliming when carried out to the extent required for the best use of the reagents must be done at the expense of the deslimed sands concentration. The existing types of classifiers when operated to carry out the desired degree of desliming can not be made to produce a sufficiently dense deslimed sand and water mixture so that the latter can be conditioned with the reagents without further dewatering.

Conditioning phosphate ore flotation feed with the reagents at this high solid content is a practical necessity. Conditioning the feed in the diluted condition in which it ordinarily comes from a desliming operation in a hindered settling hydraulic classifier either results in a failure of the flotation altogether or produces such poor recovery as to render the cost of the flotation excessive. On the other hand the necessity for a dewatering operation is particularly undesirable in processing phosphate ores since the product is sold at such a low price and the margin of profit is so small that even a few cents per ton variation in the processing cost is important.

Still another instance occurs in the beneficiation of ores by a band size flotation process such as that disclosed in U. S. Letters Patent No. 2,156,245 to Mead and Weaver. In this type of process the particulate material is separated into definite band size ranges by means of a multiple-pocket hindered settling classifier using a teeter column in each pocket.

Since this type of process is also very commonly used in the beneficiation of phosphate ores, the problem of desliming is again encountered. It is desirable that the material be at least partially deslimed before being passed to the band-sizer. Yet it is undesirable with any hindered settling sizer to introduce any more water with the feed than is absolutely necessary since the water so introduced is "lazy" water and not only serves no useful purpose but increases the "hydraulic" water consumed by the machine. Ordinary hindered settling classifiers which discharge the underflow through spigots such as a Fahrenwald sizer are satisfactory so far as the desliming is concerned but have an underflow which is much too dilute for feed to a band-sizer.

There exists therefore a definite need for a means capable of producing a sharp classification with a dense underflow. By means of the apparatus of the present invention this highly desirable result may be accomplished. The superiority of a hindered settling classifier in making a sharp classification can be used to full advantage and still obtain an underflow having a solid content of 60% or greater. This is accomplished without compromise either in the extent to which the classification is carried out or in the density of the underflow obtained, yet requires the use of but a single mechanism.

In general this is carried out by providing a pocket in the classification chamber in which the deslimed sands at the desired density for conditioning with the flotation reagent may accumulate and lifting the sands from this pocket up through a conduit large enough in cross-section so that the sands can be made to move therethrough without requiring an excessive power consumption.

One embodiment of the invention is shown in the accompanying drawings wherein:

Figure 1 is a vertical section through the apparatus;

Figure 2 is a vertical section through the apparatus along line 2—2 of Figure 1; and Figure 3 is a horizontal plan of the apparatus along line 3—3 of Figure 1.

Referring to Figure 1, I represents a sloping sided settling basin having a lower section of uniform horizontal cross section supported by frame 2 and having a series of constriction plates 3 arranged in stepwise formation along its bottom. Hydraulic water is admitted below the constriction plates through a series of inlet pipes 4, and may be adjusted in volume to control the rate of settling and the particle size range which comprises the desired underflow. The upflow of the water carries the undersized particles to the top of the settling basin, out through the holes 5, best shown in Figure 2, and into the launders 6 through which they are led to any convenient place of disposal. A mixture of ungraded particles is fed to the apparatus through the downspout 7 and is thereby disseminated through the apparatus. The underflow gradually moves down over the stepped constriction plates to the lowermost point in the settling basin from which it is lifted up through pipes 8 by means of a duplex diaphragm pump generally designated as 9.

In order to maintain a constant average density throughout the classifier, a standpipe supported by any desired means such as the brace 26 is provided. On the upper end of the column a bellows diaphragm 11 is fixed. This bellows is operated by the "super-elevation" of water in the standpipe which is produced by the high density of the material in the classifier. Bellows 11, by means of arm 12 operates a reversing mercury-switch contained within a box 14. Box 14 may be supported on the classifier by any desired means, as for example by the bracket 15 shown in Figure 2. The box 14 also contains a time-interval relay. The time-interval relay and reversing mercury-switch are connected by wires 16 to a motor-driven stroke control 17. The initial setting of the stroke control may be made by means of lever 18 or some equivalent device. An increase or decrease in the stroke of the diaphragm pump 9 will cause a corresponding increase or decrease in the amount of underflow removed during a given unit of time.

Sight windows 21 are provided in the sides of the settling basin in order that the operation of the classifier may be observed. Pipes 22 and valves 23 are also provided so that conduits 8 may be primed at the start. Water admitted at this point also may be used to dilute the deslimed sands and to clear any occasional stoppages.

Arm 12 is fastened to a post 23 rising up from the bellows diaphragm 11 by some means such as a split collar 24 and bolt 25. This is an important advantage of the preferred design of the present apparatus because it permits a ready adjustment of the teeter column to take care of large variations in the type of material being classified or in the average bulk density which it is desirable to maintain in the settling basin. By moving the position of the collar 24 on post 23 a sharp adjustment can be made without moving the position of the standpipe 10.

The stepwise placement of the constriction plates 3 has been found to be better adapted to the production of a dense, deslimed sand and water mixture than a sloping bottom. The stepwise movement of the settled sands insures a good grading. It is also found, as is most clearly shown in Figure 2, that it is best to have the inlet end of the conduit 8 as near the bottom of the settling basin as possible. In the embodiment illustrated this is the lowermost step. Otherwise, a part of the bottom may acquire a semi-permanent covering of sand which may block the inflow of hydraulic water through that area and upset the steady upflow of water. For the same reason it is well to place the control column as far from the conduit as practicable. This eliminates as far as possible any effect on the teeter column of the material being taken into the conduit and thereby aids in maintaining a more uniform average bulk density in the settling basin.

While the drawings show a preferred arrangement of the parts for use with ores such as Florida pebble phosphate, the exact arrangement of the parts is not essential to the present invention. When the apparatus is to be used with other ores or for other purposes than desliming, it may be desirable to locate either the standpipe or the outlet conduits at different parts of the chamber or at different elevations. The location of the elements will depend largely on the nature of the feed and the classification to be made.

The operation of the apparatus is readily apparent from the description of the various parts. Particulate material is fed in through the inlet 7, is distributed throughout the classifier and hydraulic water rising upwardly through the holes in the constriction plates 3 carries the lighter fractions up and out of the apparatus. The denser fractions gradually settle down to the lowermost part of the setting basin from which they are carried upwardly through pipes 8 by the pump 9 and are discharged through pipe 20 to any desired point. Variations in the amount of material being fed to the classifier or in the screen analysis of the feed affect the average density in the classifier which causes a proportional change in the rate at which the underflow is being removed by pump 9 and thereby restores the optimum average density. Since the hydraulic water inflow is not changed after its initial setting to the optimum flow necessary to maintain the desired teeter density conditions, automatic control of the amount of underflow removed automatically takes care of any but extreme changes in the nature or amount of the feed.

Although the component parts of the apparatus itself are relatively simple, in its operation the apparatus has many distinct advantages. In a single mechanism, it provides the solution to both the desliming and dewatering problems without any loss to either function. A positive automatic control of both the overflow and underflow fineness is assumed. A minimum water consumption for the fractionating desired is also maintained which is of especial advantage in many parts of the country where the problem of water supply is particularly important. The amount of power consumed by the apparatus is very low. The underflow is removed without the loss of any hydraulic head. Of particular advantage is the fact that the underflow can be removed in such a dense, dewatered condition that while it will not flow by gravity yet will require no additional dewatering in order to be used in subsequent operations.

When the classifier of the present invention is used in a closed circuit with a ball mill or the like, the full benefit of the advantages of the apparatus may be obtained. As pointed out above, in beneficiating Florida pebble phosphate the settled, dewatered sands constitute the flotation feed but when the sizer is used in a grinding circuit, the underflow constitutes the grinding mill feed and the overflow comprises the flotation feed. In such cases, it is important that the overflow as well as the underflow contain the minimum practicable amount of water since it is much simpler to dilute a flotation feed if necessary, than it is to dewater it. Because the classifier of the present invention is designed to use the minimum practicable amount of hydraulic water in order to produce a dense underflow, it necessarily introduces a minimum water content into the overflow.

At the same time, an additional advantage is obtained due to the fact that the underflow is removed by elevating it above the level of the water in the classifier. Because of this fact, a close-coupled circuit between a mill and the classifier can be readily made. The underflow, after removal from the classifier can be fed directly to the mill without the necessity for any additional elevating mechanism such as would be required with a Fahrenwald sizer or the like. At the same time the mill discharge can be directly fed to the classifier.

While the embodiment of the invention shown in the drawings has many specific features these may be varied to a considerable extent without departing from the spirit of the present invention. For example, the drawings in Figure 1 show two underflow removal pipes and the duplex pump 9 has two operating diaphragms. The number of these outlets used can be varied according to the size of the apparatus without departing from the spirit of the present invention. While the drawings and description have referred to a diaphragm pump, any other form of suction pump may be substituted therefor. The standpipe and bellows arrangement may be replaced by any other pressure sensitive device for operating the control system which regulates the amount of underflow removed in a given time. The particular shape and arrangement of the settling basin itself may be varied if for some particular reason it is desirable to do so.

While the above discussion has been largely limited to operations in ore dressing the apparatus obviously has applications in any other field where it is desirable to produce sharp classification of particulate material with one classified portion in dewatered condition. This would be of advantage for example, in those classification operations where the product fraction must subsequently be dried as in the classification of abrasives. Although the present discussion has been limited to water, other media may be used. The use of other liquids is largely limited by economic considerations and would probably be limited to small scale apparatus.

We claim:

1. In a hindered-settling hydraulic classifier adapted to deliver coarse sands underflow too dense for practical spigot discharge, the combination of a classification chamber having a lower section adapted to hindered-settling, said lower section having a depth substantially equal to the height of the teeter column to be maintained, a pocket at a low point in said lower section, said pocket having sufficient depth for the accumulation therein of a sand-water mixture containing less than one-half water, means for admitting hydraulic water at a plurality of points near the bottom of said lower section, an upper section having a horizontal cross-section which is gradually enlarged from that at the juncture with the lower section to an area such that the upward rising velocity of the water flow required to maintain teeter in said lower section will not exceed the free-falling rate of the smallest particles to be retained, overflow means adapted to remove the undersized particles, a conduit extending from the point near the bottom of said pocket to a point above the level of the water in the classification chamber, said conduit being of sufficient size to permit passage therethrough of the settled dewatered sands, a diaphragm pump above said chamber adapted to lift said coarse dewatered sands through said conduit, and an automatic control means adapted to limit the coarse dewatered sands removed per unit time through said conduit to that amount which maintains a constant average bulk density in the classification chamber.

2. An apparatus as in claim 1 in which said automatic control means comprises a standpipe and means operated by the super-elevation of water in said standpipe whereby the stroke of said diaphragm pump is adjusted to maintain a constant average bulk density in said classification chamber.

3. An apparatus as in claim 1 in which said automatic control means comprises a motor-driven stroke control adapted to vary the stroke of said diaphragm pump, switch means adapted to actuate said motor-driven stroke control and a standpipe carrying a bellows diaphragm responsive to changes in said average bulk density adapted to actuate said switch means.

HARRY L. MEAD.
ERNEST J. MAUST.

CERTIFICATE OF CORRECTION.

Patent No. 2,358,181. September 12, 1944.

HARRY L. MEAD, ET AL.

It is hereby certified that error appears in the printed specification of the above numbered patent requiring correction as follows: Page 3, second column, line 5, for the word "assumed" read --assured--; and that the said Letters Patent should be read with this correction therein that the same may conform to the record of the case in the Patent Office.

Signed and sealed this 19th day of December, A. D. 1944.

Leslie Frazer (Seal) Acting Commissioner of Patents.